US012651943B2

(12) United States Patent
Alahyari et al.

(10) Patent No.: US 12,651,943 B2
(45) Date of Patent: Jun. 9, 2026

(54) ELECTRIC MOTOR WITH INTEGRATED COOLING

(71) Applicant: Hamilton Sundstrand Corporation, Charlotte, NC (US)

(72) Inventors: Abbas A. Alahyari, Glastonbury, CT (US); Kimberly Rae Saviers, Glastonbury, CT (US); Jagadeesh Kumar Tangudu, South Windsor, CT (US); Aritra Sur, Manchester, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 152 days.

(21) Appl. No.: 18/264,469

(22) PCT Filed: Feb. 9, 2021

(86) PCT No.: PCT/US2021/017229
§ 371 (c)(1),
(2) Date: Aug. 7, 2023

(87) PCT Pub. No.: WO2022/173418
PCT Pub. Date: Aug. 18, 2022

(65) Prior Publication Data
US 2024/0048030 A1 Feb. 8, 2024

(51) Int. Cl.
*H02K 9/20* (2006.01)
*H02K 3/24* (2006.01)
(Continued)

(52) U.S. Cl.
CPC ................. *H02K 9/20* (2013.01); *H02K 3/24* (2013.01); *H02K 9/225* (2021.01)

(58) Field of Classification Search
CPC ............. H02K 9/20; H02K 9/225; H02K 3/24
See application file for complete search history.

(56) References Cited

U.S. PATENT DOCUMENTS

| | | | |
|---|---|---|---|
| 4,994,700 A * | 2/1991 | Bansal | H02K 3/48 |
| | | | 310/60 A |
| 6,787,948 B2 | 9/2004 | Peterson et al. | |

(Continued)

FOREIGN PATENT DOCUMENTS

| | | | | |
|---|---|---|---|---|
| DE | 102010041586 A1 * | 3/2012 | | H02K 9/00 |
| DE | 102015216374 A1 * | 3/2017 | | H02K 9/22 |

(Continued)

OTHER PUBLICATIONS

International Search Report for International Application No. PCT/US2021/017229; Date of Search Oct. 22, 2021; 5 pages.
(Continued)

*Primary Examiner* — Burton S Mullins
(74) *Attorney, Agent, or Firm* — CANTOR COLBURN LLP

(57) ABSTRACT

Electric motors and stators thereof are described. The stators of the electric motors include a first header, a second header fluidly connected to the first header, a plurality of windings fluidly connected to the first header and the second header to receive a cooling fluid passing from the first header to the second header along one or more flow channels, and one or more phase-change material elements arranged to thermally interact with at least one of the first header, the second header, the one or more flow channels, and the plurality of windings.

19 Claims, 6 Drawing Sheets

(51) Int. Cl.
 *H02K 9/22* (2006.01)
 *H02K 9/24* (2006.01)

(56) References Cited

U.S. PATENT DOCUMENTS

| | | | |
|---|---|---|---|
| 10,008,907 B2 * | 6/2018 | Hanumalagutti | ...... H02K 9/197 |
| 11,264,854 B2 | 3/2022 | Klonowski et al. | |
| 2016/0043613 A1 | 2/2016 | Patel et al. | |
| 2016/0285345 A1 * | 9/2016 | Adimula | .................. H02K 5/18 |
| 2020/0076262 A1 * | 3/2020 | Klonowski | .............. H02K 3/28 |
| 2021/0305883 A1 * | 9/2021 | Vanhee | .................. H02K 21/14 |
| 2021/0351667 A1 * | 11/2021 | Huang | ..................... H02K 1/16 |
| 2022/0045575 A1 | 2/2022 | Huber et al. | |

FOREIGN PATENT DOCUMENTS

| | | | |
|---|---|---|---|
| JP | 2006033916 A | 2/2006 | |
| JP | 2006226127 A | 8/2006 | |
| JP | 2009167857 A | 7/2009 | |
| JP | 2011182573 A | 9/2011 | |
| JP | 2020519224 A | 6/2020 | |
| JP | 2020198718 A | 12/2020 | |
| KR | 20130016703 A | 2/2013 | |
| WO | 2018100075 A1 | 6/2018 | |

OTHER PUBLICATIONS

Written Opinion for International Application No. PCT/US2021/017229, 9 pages.

Japanese Office Action for JP Application No. 2023-547780, dated Jan. 7, 2025, pp. 1-14.

JP Japanese Office Action for JP Application No. 2023-547780, dated Jul. 22, 2025, with English Translation, 16 pages.

CA Office Action for Application No. 3,209,428, mailed Jan. 19, 2026, 4 pages.

JP Office Action with English Translation for Application No. JP 2023-547780, mailed Jan. 20, 2026, 19 pages.

\* cited by examiner

100

400

404

406

416

416

416

416

416

416

416

408

410

412

414 414

414

414

414

414

ELECTRIC MOTOR WITH INTEGRATED COOLING

CROSS-REFERENCE TO RELATED APPLICATIONS

This application is a U.S. National Stage Application of International Application No. PCT/US2021/017229, filed Feb. 9, 2021, the disclosure of which is incorporated herein by reference in its entirety.

BACKGROUND

The present disclosure relates to an electric motor, and more particularly, to assemblies having integrated cooling.

Traditional electric motors may include a stator and a rotor, with electrical motor windings in the stator that, when energized, drive rotation of the rotor about a central axis. Heat is generated in the motor windings, which are located in slots in the stator. The windings are separated from the exterior of the motor by layers of insulation and laminated steel, which makes up the stator. These contributors to internal thermal resistance limit the allowable heat generation and thus the allowable electrical current in the windings. The energy density of an electric motor is typically limited by heat dissipation from the motor windings of the stator. The requirement to be met is a maximum hot spot temperature in the motor windings that is not to be exceeded. Conventional motor thermal management includes natural convection from large fins on the outside of a motor jacket, or liquid cooling in the motor jacket. Both of these solutions undesirably add volume and/or weight to the motor, due to the addition of the jacket.

BRIEF DESCRIPTION

According to some embodiments of the present disclosure, stators of electric motors are provided. The stators include a first header, a second header fluidly connected to the first header, a plurality of windings fluidly connected to the first header and the second header to receive a cooling fluid passing from the first header to the second header along one or more flow channels, and one or more phase-change material elements arranged to thermally interact with at least one of the first header, the second header, the one or more flow channels, and the plurality of windings.

In addition to one or more of the features described herein, or as an alternative, further embodiments of the stators may include that the one or more phase-change material elements include a phase-change material element arranged between sections of the plurality of windings.

In addition to one or more of the features described herein, or as an alternative, further embodiments of the stators may include that the one or more phase-change material elements include a phase-change material element arranged within a winding of the plurality of windings.

In addition to one or more of the features described herein, or as an alternative, further embodiments of the stators may include that the one or more phase-change material elements include a phase-change material element arranged within one of the one or more flow channels.

In addition to one or more of the features described herein, or as an alternative, further embodiments of the stators may include that the one or more phase-change material elements include a phase-change material element arranged along a radially interior surface of the plurality of windings.

In addition to one or more of the features described herein, or as an alternative, further embodiments of the stators may include that the one or more phase-change material elements include a phase-change material element arranged within the first header.

In addition to one or more of the features described herein, or as an alternative, further embodiments of the stators may include that the first header is an outlet header of the stator.

In addition to one or more of the features described herein, or as an alternative, further embodiments of the stators may include one or more heat transfer augmentation features arranged within the first header and configured to provide an increased surface area of thermal contact between the phase-change material element and the cooling fluid within the first header.

In addition to one or more of the features described herein, or as an alternative, further embodiments of the stators may include that the first header is an inlet header and the second header is an outlet header and the cooling fluid is configured to flow through the first header to the second header and provide cooling to the plurality of windings.

In addition to one or more of the features described herein, or as an alternative, further embodiments of the stators may include that the one or more phase-change material elements include a paraffin-based wax, a salt hydrate, an acrylic-based material, and a metallic-based material.

According to some embodiments, electric motors are provided. The electric motors include a rotor rotatable about a rotation axis and a stator disposed relative the rotor with a radial air gap between the rotor and the stator. The stator includes a first header, a second header fluidly connected to the first header, a plurality of windings fluidly connected to the first header and the second header to receive a cooling fluid passing from the first header to the second header along one or more flow channels, and one or more phase-change material elements arranged to thermally interact with at least one of the first header, the second header, the one or more flow channels, and the plurality of windings.

In addition to one or more of the features described herein, or as an alternative, further embodiments of the electric motors may include that the one or more phase-change material elements include a phase-change material element arranged between sections of the plurality of windings.

In addition to one or more of the features described herein, or as an alternative, further embodiments of the electric motors may include that the one or more phase-change material elements include a phase-change material element arranged within a winding of the plurality of windings.

In addition to one or more of the features described herein, or as an alternative, further embodiments of the electric motors may include that the one or more phase-change material elements include a phase-change material element arranged within one of the one or more flow channels.

In addition to one or more of the features described herein, or as an alternative, further embodiments of the electric motors may include that the one or more phase-change material elements include a phase-change material element arranged along a radially interior surface of the plurality of windings.

In addition to one or more of the features described herein, or as an alternative, further embodiments of the electric motors may include that the one or more phase-change material elements include a phase-change material element arranged within the first header.

In addition to one or more of the features described herein, or as an alternative, further embodiments of the electric motors may include that the one or more phase-change material elements include a paraffin-based wax, a salt hydrate, an acrylic-based material, and a metallic-based material.

According to some embodiments, aircraft power systems are provided, the aircraft power systems include an electric motor having a rotor rotatable about a rotation axis and a stator disposed relative to the rotor with a radial air gap between the rotor and the stator. The stator includes a first header, a second header fluidly connected to the first header, a plurality of windings fluidly connected to the first header and the second header to receive a cooling fluid passing from the first header to the second header along one or more flow channels, and one or more phase-change material elements arranged to thermally interact with at least one of the first header, the second header, the one or more flow channels, and the plurality of windings.

In addition to one or more of the features described herein, or as an alternative, further embodiments of the aircraft power systems may include that the one or more phase-change material elements include a phase-change material element arranged between sections of the plurality of windings.

In addition to one or more of the features described herein, or as an alternative, further embodiments of the aircraft power systems may include that the one or more phase-change material elements include a phase-change material element arranged within the first header.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1A:
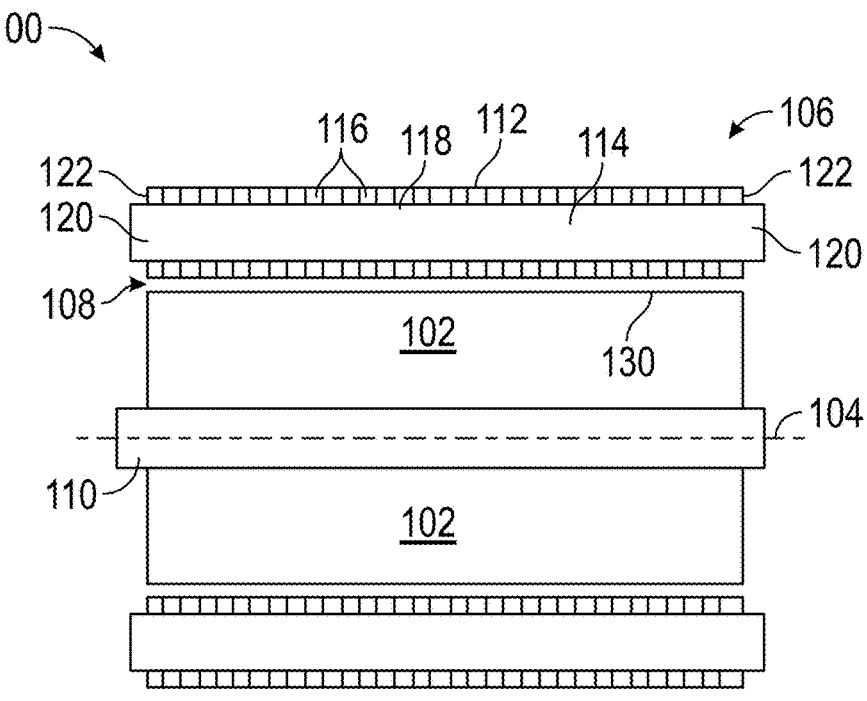
FIG. 1A is a partial view of an embodiment of electric motor.
Figure 1B:
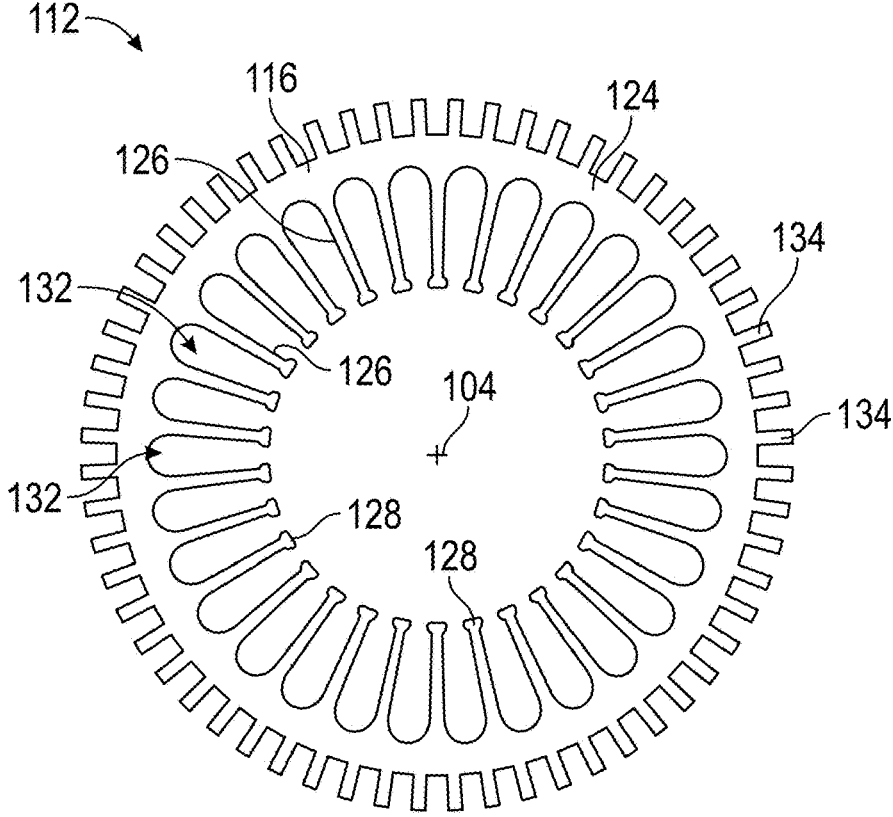
FIG. 1B is a cross-sectional view of an embodiment of a stator core of the electric motor of FIG. 1A.

Referring to FIGS. 1A-1B, schematic illustrations of an electric motor 100 that may incorporate embodiments of the present disclosure are shown. FIG. 1A illustrates a cross-sectional view of the electric motor 100 and FIG. 1B illustrates a cross-sectional view of a stator core of the electric motor 100. The electric motor 100 includes a rotor 102 configured to rotate about a rotation axis 104. A stator 106 is located radially outboard of the rotor 102 relative to the rotation axis 104, with a radial air gap 108 located between the rotor 102 and the stator 106. As illustrated, the rotor 102 may be mounted on a shaft 110 which may impart rotational movement to the rotor 102 or may be driven by rotation of the rotor 102, as will be appreciated by those of skill in the art. The rotor 102 and the shaft 110 may be fixed together such that the rotor 102 and the shaft 110 rotate about the rotation axis 104 together as one piece.

The stator 106 includes a stator core 112 in which a plurality of electrically conductive stator windings 114 are disposed. In some embodiments, such as shown in FIG. 1A, the stator core 112 is formed from a plurality of axially stacked laminations 116, which are stacked along the rotation axis 104. In some embodiments, the laminations 116 are formed from a steel material, but one skilled in the art will readily appreciate that other materials may be utilized. The stator windings 114, as shown, include core segments 118 extending through the stator core 112 and end turn segments 120 extending from each axial stator end 122 of the stator core 112 and connecting circumferentially adjacent core segments 118. When the stator windings 114 are energized via an electrical current therethrough, the resulting field drives rotation of the rotor 102 about the rotation axis 104. Although FIG. 1A illustrates the stator core 112 arranged radially inward from the stator windings 114, it will be appreciated that other configurations are possible without departing from the scope of the present disclosure. For example, in some embodiments, the stator structure may be arranged radially inward from a rotating rotor structure.

FIG. 1B is an axial cross-sectional view of the stator core 112. Each lamination 116 of the stator core 112 includes a radially outer rim 124 with a plurality of stator teeth 126 extending radially inwardly from the outer rim 124 toward the rotation axis 104. Each of the stator teeth 126 terminate at a tooth tip 128, which, together with a rotor outer surface 130 (shown in FIG. 1A) of the rotor 102, may define the radial air gap 108. Circumferentially adjacent stator teeth 126 define an axially-extending tooth gap 132 therebetween. Further, in some embodiments, a plurality of stator fins 134 extend radially outwardly from the outer rim 124.

Electric motors, as shown in FIGS. 1A-1B may require cooling due to high density configurations, various operational parameters, or for other reasons. For example, high-power-density aviation-class electric motors and drives may require advanced cooling technologies to ensure proper operation of the motors/drives. These machines are generally thermally limited at high power ratings and their performance can be improved by mitigating thermal limitations. To maintain desired temperatures, a thermal management system (TMS) is integrated into the system, which provides cooling to components of the system. Onboard an aircraft, power requirements, and thus thermal management system (TMS) loads, are substantially higher during takeoff. Sizing of the TMS for takeoff conditions (i.e., maximum loads) results in a TMS having a high weight to accommodate such loads. This results in greater weight and lower power density during cruise conditions which do not generate such loads, and thus does not require a high cooling capacity TMS. Balancing weight constraints and thermal load capacities is important for such aviation applications.

In view of such considerations, embodiments of the present disclosure are directed to strategically embedding or incorporating phase-change material ("PCM") within the components of the motor and drive cooling system in order to accommodate the transient loads, such as those experienced during takeoff, while minimizing weight of the system. In accordance with some embodiments of the present disclosure, the material may be embedded in cooling flow channels or in headers of the TMS. Further, in some embodiments, for drive components, PCM may be embedded in cold plates. The PCM may be selected based on temperature limits of components. For example, and without limitation, materials used for cooling in accordance with embodiments of the present disclosure may include paraffin-based waxes, salt hydrates, acrylic-based PCMs, and metallic PCMs for high-temperature applications. The volume of the PCM may be sized to accommodate the excess load from takeoff flight operations without substantially increasing the volume or weight of the motor system. The PCM may be contained within an enclosure that is integrated into the system. The shape, geometry, and volume of the enclosure that houses the PCM may have extended surfaces (e.g., inward or outward) to maximize thermal contact and enhance heat transfer to and from the PCM. Such surface features of the housing may thermally connect the PCM to specific hot spots and heat rejection surfaces via heat pipes, fins, pins, and the like. In accordance with some embodiments, the housing, casing, or containment material of the PCM may be, for example and without limitation, aluminum, copper, polymer, polymer composite, dielectric material, and the like.

During operation, a PCM element may be used to absorb thermal energy to thus increase a load capacity of a system, without requiring additional fluids and/or structures. The PCM elements may be arranged as a solid during normal operational uses, and when heat loads increase beyond a set point, the PCM may change phase from the solid to a liquid or gas. The change in material is achieved due to high temperatures. After the high temperature load is removed, the PCM element may change back to the normal state (e.g., solid), and the retained heat may be slowly dissipated through normal cooling channels (e.g., using a conventional cooling fluid of the system).

Figures 2A, 2B:
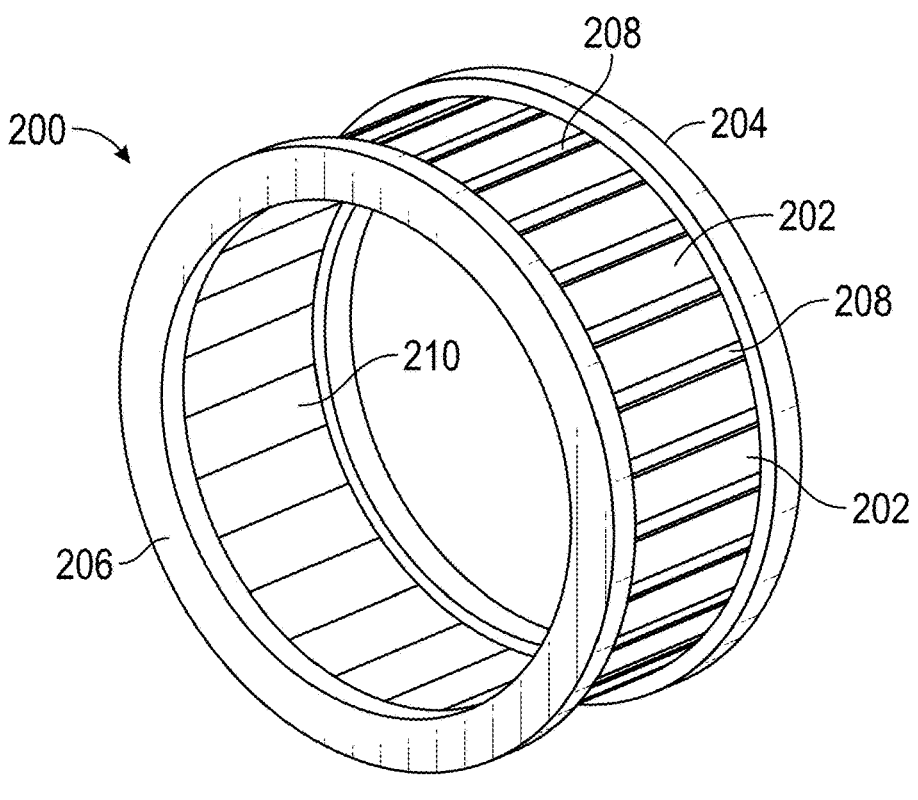
FIG. 2A is a schematic illustration of a portion of an electric motor in accordance with an embodiment of the present disclosure.
FIG. 2B is a partial cut-away illustration of the portion of the electric motor of FIG. 2A.

Turning now to FIGS. 2A-2B, schematic illustrations of a portion of an electric motor for use on an aircraft power system are shown. FIGS. 2A-2B illustrate a portion of a stator 200 having windings 202, similar to that described above, for example. At ends of the stator 200 may be a first header 204 and a second header 206. A cooling fluid may be conveyed into the first header 204, passed through or along the windings 202, and into the second header 206. The cooling fluid may be actively passed through a flow path that includes the first and second headers 204, 206 and may provide cooling to the stator 200. The first and second headers 204, 206 may be hollow body structures for containing and retaining a cooling fluid therein. In some embodiments, the first and second headers 204, 206 may be fluidly connected, and in other embodiments, the first and second headers 204, 206 may be thermally connected but not fluidly connected.

The stator 200 shown in FIGS. 2A-2B includes phase-change material (PCM) arranged throughout to augment and improve cooling at specific locations about the stator 200. The PCM may be arranged at specific locations that are high-load locations during maximum operation (e.g., during takeoff of an aircraft). For example, as shown in FIGS. 2A-2B, a first PCM element 208 may be arranged between windings 202 of the stator 200. The first PCM element 208 may extend between and thermally contact the first and second headers 204, 206. A second PCM element 210 may be arranged on an interior radius or diameter of the windings 202 (e.g., along a radially interior surface of the windings 202) and may also extend between the first and second headers 204, 206, although such configuration is not required. In some embodiments, a similar PCM element may be arranged on an outer radius or diameter of the windings 202 (e.g., along a radially interior surface of the windings 202). In some embodiments, both inner and outer arrangements of PCM elements relative to the windings may be employed, or merely one or the other.

A third PCM element 212 may be arranged within a header of the stator 200. For example, as shown in FIG. 2B, the third PCM element 212 is arranged within the first header 204. The first header 204 includes a primary cavity 214 for receiving a cooling fluid for normal cooling operations. This, however, is supplemented by the third PCM element 212 which can increase thermal capacity load of the cooling fluid. To increase thermal contact and exchange between the cooling fluid within the primary cavity 214 and the third PCM element 212, one or more heat transfer augmentation features 216 may be arranged between the primary cavity 214 and the third PCM element 212. The heat transfer augmentation features 216 may include, for example, pins, fins, heat pipes, and the like.

As shown in FIG. 2B, the first and second PCM elements 208, 210 may be separate elements. In other embodiments, the first and second PCM elements 208, 210 may be formed as a single structure, with the windings 202 arranged within the structure of the combined PCM element structure. Further, although the second header 206 is not shown with any interior structures, those of skill in the art will appreciate that the second header 206 can include interior structures and a PCM element similar to that shown with respect to the first header 204.

Figure 3A:
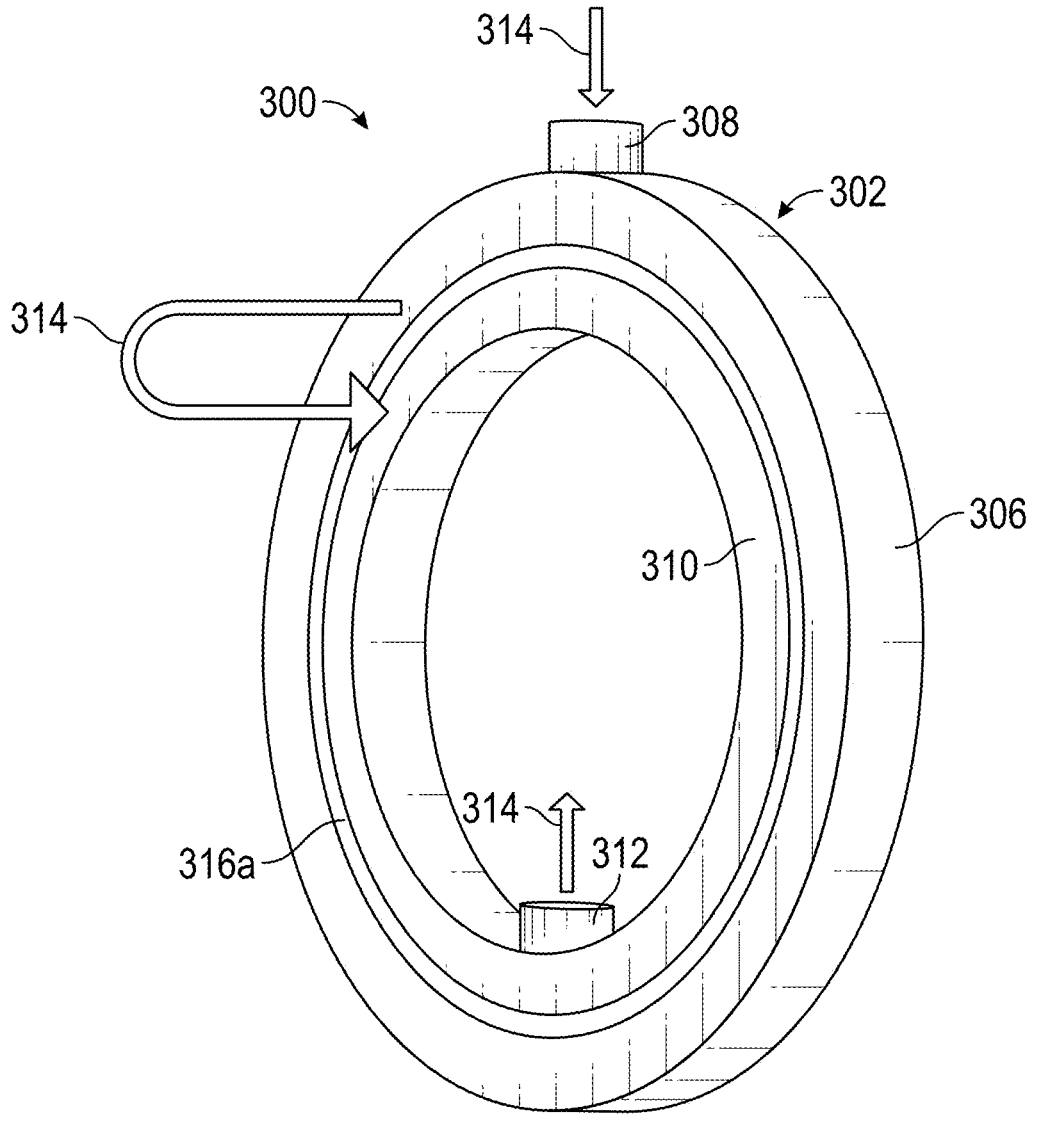
FIG. 3A is a schematic illustration of a header configuration of an electric motor in accordance with an embodiment of the present disclosure.
Figure 3B:
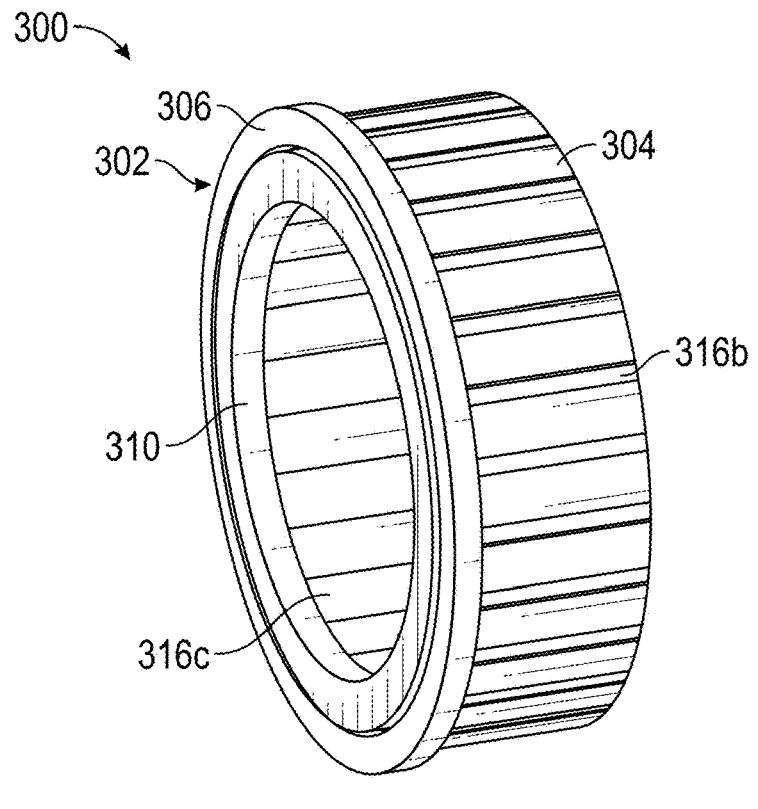
FIG. 3B is a schematic illustration of the electric motor of FIG. 3A showing windings attached to the header configuration.
Figure 3C:
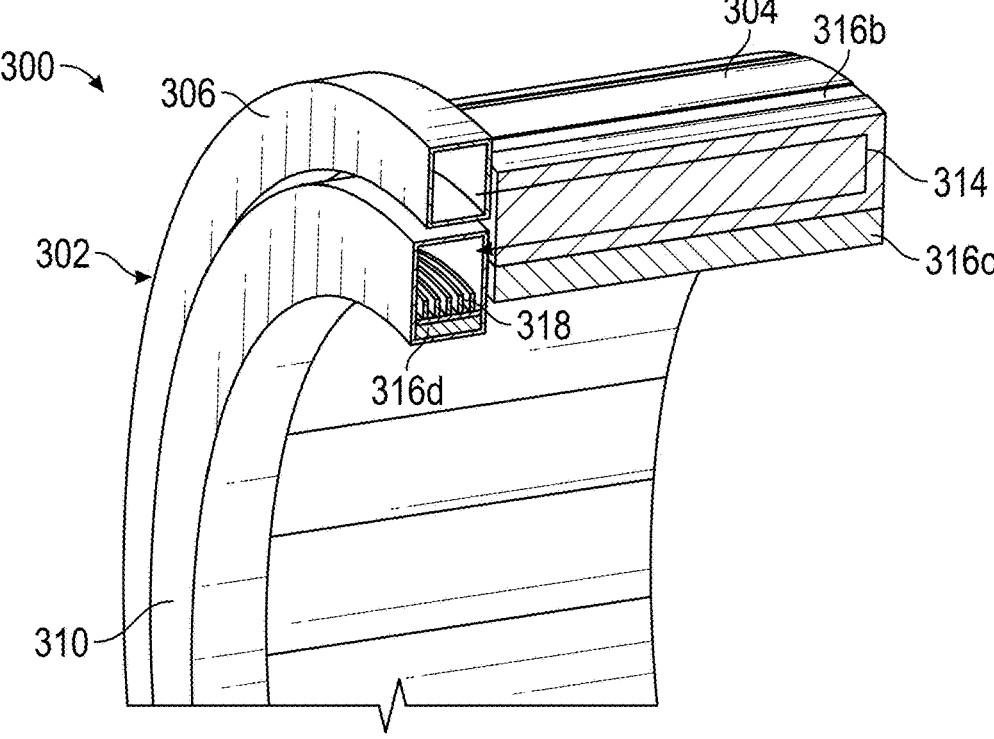
FIG. 3C is an enlarged schematic illustration of a portion of the view shown in FIG. 3B.

Turning now to FIGS. 3A-3C, schematic illustrations of a portion of an electric motor 300 in accordance with an embodiment of the present disclosure is shown. FIG. 3A illustrates a header configuration 302, FIG. 3B illustrates the header configuration 302 having windings 304 connected thereto, and FIG. 3C illustrates an enlarged view of a portion of the electric motor 300. The header configuration 300 includes an inlet header 306 having an inlet 308 and an outlet header 310 having an outlet 312. A cooling fluid may flow into the inlet header 306 through the inlet 308, follow a flow path 314 to the outlet header 310 and exit through the outlet 312.

To accommodate increased transient heat loads, one or more PCM elements 316a, 316b, 316c, 316d may be arranged within the electric motor 300. For example, as shown in FIG. 3A, a first PCM element 316a may be arranged between the inlet header 306 and the outlet header 310. As shown in FIGS. 3B-3C, a second PCM element 316b may be arranged between adjacent sections of the windings 304. A third PCM element 316c may be arranged to line an interior of the windings 304 within the electric motor 300. A fourth PCM element 316d may be arranged within one or both of the headers 306, 310, and is shown within the outlet header 310 in FIG. 3C. Also shown in FIG. 3C, the outlet header 310 includes one or more heat transfer augmentation features 318 arranged to increase a thermal transfer between a cooling fluid within the outlet header 310 and the fourth PCM element 316d. The heat transfer augmentation features 318 may include, for example, pins, fins, heat pipes, and the like.

During high loads, the PCM elements 316a-d may absorb a portion of the thermal load, thus improving the thermal efficiency of the system. Each of the PCM elements 316a-d may be formed of a housing that contains a phase-change material therein. The exterior facing surfaces of the PCM elements 316a-d may include one or more heat transfer augmentation features that can extend into the respective components to which they are thermally connected.

As shown in FIG. 3C, the flow path 314 of a windings cooling fluid will pass from the inlet header 306, into and through the windings 304, and then enter the outlet header 310 to be cycled through a cooling system. As the cooling fluid flows through each of the inlet header 306, the windings 304, and the outlet header 310, the PCM elements 316a-d may pick up heat from the cooling fluid. This thermal energy is stored within the PCM elements 316a-d until a load is reduced or removed. When the PCM elements 316a-d absorb heat, the phase of the phase-change material will change (e.g., from solid to liquid, solid to gas, or liquid to gas). When the load is removed, and the overall temperature is reduced, the heat retained within the PCM elements 316a-d will be absorbed into the cooling fluid and the phase of the PCM elements 316a-d will change back. As such, a passive transient load capacity is increased through the inclusion of the PCM elements 316a-d or other PCM elements arranged within and along the flow path 314 and/or within the electric motor 300.

Figure 4:
FIG. 4 is a schematic illustration of a configuration of an electric motor in accordance with an embodiment of the present disclosure.

Turning now to FIG. 4, a schematic illustration of a portion of an electric motor 400 in accordance with an embodiment of the present disclosure is shown. The electric motor 400 can include a rotor (e.g., a rotating magnet) that may be arranged about or within a stator 404. The stator 404 includes windings 406 distributed or arranged in a ring or annular shape. The windings 406 generate heat during operation, and thus active cooling is provided using a cooling system 408. The cooling system 408 includes an inlet header 410 and an outlet header 412. Flow channels 414 extend from the inlet header 410, through the windings 406, and to the outlet header 412. A cooling fluid is pumped or passed through the headers 410, 412 and the flow channels 414. The cooling fluid is configured to absorb and remove heat from the windings 406. The cooling fluid thus increases in temperature as it passes from the inlet header 410, through the flow channels 414, and exits into the outlet header 412. Although this configuration is suitable for normal operations, during high transient load operations (e.g., takeoff of an aircraft), in order to accommodate such increased loads, the system may require higher capacity. As noted above, one solution is to increase the cooling system 408 in size/capacity. Such increases in cooling capacity come with drawbacks associated with volume and weight, and potentially with additional complexity.

However, as shown in FIG. 4, the inclusion of PCM elements 416 at various locations of the electric motor 400 may provide for additional cooling to be supplied to the electric motor 400, for example during high load operations. As shown, the PCM elements 416 are arranged on or in various components of the electric motor 400. In this illustrative embodiment, the PCM elements 416 are arranged on the inlet and outlet headers 410, 412, along or in the flow channels 414, and along or within the winding 406.

Figure 5:
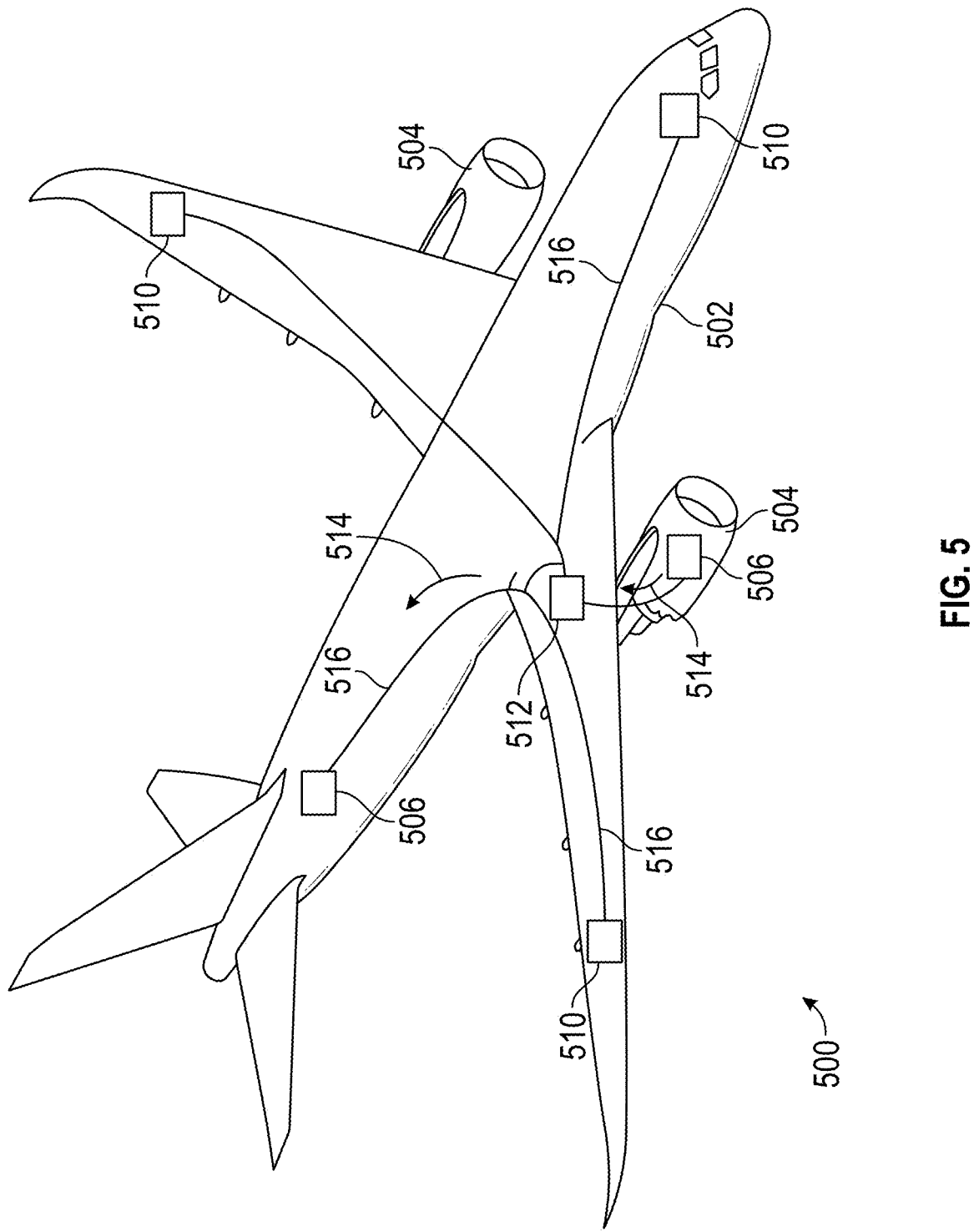
FIG. 5 is a schematic view of a power system of an aircraft that may employ embodiments of the present disclosure.

Referring to FIG. 5, a power system 500 of an aircraft 502 is shown. The power system 500 includes one or more engines 504, one or more electric motors 506, a power bus electrically connecting the various power sources 504, 506, and a plurality of electrical devices 510 that may be powered by the engines 504 and/or motors 506. The power system 500 includes a power distribution system 512 that distributes power 514 through power lines or cables 516. The electric motors 506 may include cooling schemes as shown and described above.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A stator of an electric motor comprising:
a first header;
a second header fluidly connected to the first header;
a plurality of windings;
one or more flow channels extending through the plurality of windings and fluidly connecting the first header to the second header, the one or more flow channels configured to receive a cooling fluid passing from the first header to the second header to pick up heat from the plurality of windings; and
one or more phase-change material elements arranged to thermally interact with at least one of the first header, the second header, the one or more flow channels, and the plurality of windings, wherein the one or more phase-change material elements each comprise a housing configured to thermally connect a phase-change material within the housing with the respective at least one of the first header, the second header, the one or more flow channels, and the plurality of windings, wherein the one or more phase-change material elements include a phase-change material element arranged within one of the one or more flow channels.

2. The stator of claim 1, wherein the one or more phase-change material elements include a phase-change material element arranged between sections of the plurality of windings.

3. The stator of claim 1, wherein the one or more phase-change material elements include a phase-change material element embedded within a structure of a winding of the plurality of windings.

4. The stator of claim 1, wherein the one or more phase-change material elements include a phase-change material element arranged along a radially interior surface of the plurality of windings.

5. The stator of claim 1, wherein the one or more phase-change material elements include a phase-change material element arranged within the first header.

6. The stator of claim 5, wherein the first header is an outlet header of the stator.

7. The stator of claim 5, further comprising one or more heat transfer augmentation features arranged within the first header and configured to provide an increased surface area of thermal contact between the phase-change material element and the cooling fluid within the first header.

8. The stator of claim 7, wherein the first header is an inlet header and the second header is an outlet header and the cooling fluid is configured to flow through the first header to the second header and provide cooling to the plurality of windings.

9. The stator of claim 1, wherein the one or more phase-change material elements include a paraffin-based wax, a salt hydrate, an acrylic-based material, and a metallic-based material.

10. An electric motor comprising:
a rotor rotatable about a rotation axis; and
a stator disposed relative to the rotor with a radial air gap between the rotor and the stator, the stator including:
a first header;
a second header fluidly connected to the first header;
a plurality of windings;
one or more flow channels extending through the plurality of windings and fluidly connecting the first header to the second header, the one or more flow channels configured to receive a cooling fluid passing from the first header to the second header to pick up heat from the plurality of windings;
one or more phase-change material elements arranged to thermally interact with at least one of the first header and the second header; and
one or more heat pipes arranged within at least one of the first header and the second header, wherein the one or more heat pipes are configured to provide an increased surface area of thermal contact between the phase-change material element and the cooling fluid within the respective header.

11. The electric motor of claim 10, wherein the one or more phase-change material elements include a phase-change material element arranged between sections of the plurality of windings.

12. The electric motor of claim 10, wherein the one or more phase-change material elements include a phase-change material element embedded within a structure of a winding of the plurality of windings.

13. The electric motor of claim 10, wherein the one or more phase-change material elements include a phase-change material element arranged within one of the one or more flow channels.

14. The electric motor of claim 10, wherein the one or more phase-change material elements include a phase-change material element arranged along a radially interior surface of the plurality of windings.

15. The electric motor of claim 10, wherein the one or more phase-change material elements each comprise a housing configured to thermally connect a phase-change material within the housing with the respective header.

16. The electric motor of claim 10, wherein the one or more phase-change material elements include a paraffin-based wax, a salt hydrate, an acrylic-based material, and a metallic-based material.

17. An aircraft power system comprising:
an electric motor having a rotor rotatable about a rotation axis and a stator disposed relative to the rotor with a radial air gap between the rotor and the stator, the stator including:
a first header;
a second header fluidly connected to the first header;
a plurality of windings;
one or more flow channels extending through the plurality of windings and fluidly connecting the first header to the second header, the one or more flow channels configured to receive a cooling fluid passing from the first header to the second header to pick up heat from the plurality of windings; and
one or more phase-change material elements arranged to thermally interact with at least the plurality of windings, wherein a phase-change temperature of the one or more phase-change material elements is based on a temperature limit of a material of the plurality of windings,
wherein the one or more phase-change material elements include a phase-change material element arranged within the first header.

18. The aircraft power system of claim 17, wherein the one or more phase-change material elements include a phase-change material element arranged between sections of the plurality of windings.

19. The aircraft power system of claim 17, wherein the one or more phase-change material elements include a phase-change material element arranged within one of the one or more flow channels.

* * * * *